US008847560B2

(12) United States Patent
De Wergifosse

(10) Patent No.: US 8,847,560 B2
(45) Date of Patent: Sep. 30, 2014

(54) AIRCRAFT POWER SUPPLY CIRCUIT INCLUDING AN ASYNCHRONOUS MACHINE

(75) Inventor: Eric De Wergifosse, Saint Augustin (FR)

(73) Assignee: Hispano-Suiza, Colombes (FR)

( * ) Notice: Subject to any disclaimer, the term of this patent is extended or adjusted under 35 U.S.C. 154(b) by 0 days.

(21) Appl. No.: 13/884,795

(22) PCT Filed: Nov. 7, 2011

(86) PCT No.: PCT/FR2011/052585
§ 371 (c)(1),
(2), (4) Date: May 10, 2013

(87) PCT Pub. No.: WO2012/062989
PCT Pub. Date: May 18, 2012

(65) Prior Publication Data
US 2013/0234679 A1 Sep. 12, 2013

(30) Foreign Application Priority Data
Nov. 10, 2010 (FR) ...................... 10 59269

(51) Int. Cl.
*H02P 9/46* (2006.01)
(52) U.S. Cl.
USPC ............................. 322/47; 322/37
(58) Field of Classification Search
USPC ......................... 322/25, 37, 44, 47
See application file for complete search history.

(56) References Cited

U.S. PATENT DOCUMENTS

| | | | | |
|---|---|---|---|---|
| 5,281,905 A | * | 1/1994 | Dhyanchand et al. ........... | 322/32 |
| 5,325,043 A | * | 6/1994 | Parro ............................. | 322/23 |
| 7,459,889 B2 | * | 12/2008 | Ganev et al. .................... | 322/37 |
| 7,508,086 B2 | * | 3/2009 | Huang et al. ................... | 290/31 |
| 7,592,786 B2 | * | 9/2009 | Xu et al. ........................ | 322/59 |
| 8,476,871 B2 | * | 7/2013 | Ooi et al. ....................... | 322/24 |

FOREIGN PATENT DOCUMENTS

FR 2 870 401 11/2005

OTHER PUBLICATIONS

Al-Saffar, M. A. et al., "Controlled Shunt Capacitor Self-Excited Induction Generator," Industry Applications Conference, Thirty-Third IAS Annual Meeting, the 1998 IEEE, vol. 2, pp. 1486 to 1490, (Oct. 12, 1998) XP10313004.
Ahmed, T., et al., "Three-Phase Self-Excited Induction Generator Driven by Variable-Speed Prime Mover for Clean Renewable Energy Utilizations and Its Terminal Voltage Regulation Characteristics by Static VAR Compensator," Conference Record of the 2003 IEEE Industry Applications Conference, 38$^{TH}$ IAS Annual Meeting, vol. 2, pp. 693 to 700, (Oct. 12, 2003) XP10676093.
International Search Report Issued Feb. 13, 2012 in PCT/FR11/52585 Filed Nov. 7, 2011.

* cited by examiner

*Primary Examiner* — Nicholas Ponomarenko
(74) *Attorney, Agent, or Firm* — Oblon, Spivak, McClelland, Maier & Neustadt, L.L.P.

(57) ABSTRACT

A power supply circuit for supplying electrical energy in an aircraft, the circuit including a power supply generator configured to be driven in rotation by the engine of the aircraft to power electrical equipment of the aircraft engine. The power supply generator includes an asynchronous machine connected to an excitation device. The asynchronous machine includes a rotor configured to be driven in rotation by the engine and a stator connected to the electrical equipment. The excitation device is configured to cause a reactive current of flow in the stator.

4 Claims, 5 Drawing Sheets

AIRCRAFT POWER SUPPLY CIRCUIT INCLUDING AN ASYNCHRONOUS MACHINE

BACKGROUND OF THE INVENTION

The invention relates to electrically powering electrical equipment of an aeroengine.

It is known to use an electricity generator incorporated in an engine of an aircraft in order to produce electrical energy for the purpose of powering electrical equipment associated with the engine. For example, document FR 2 911 848 describes a power supply generator connected to a deicing circuit of an aeroengine.

The power supply generator used in that type of application is typically a synchronous generator having two or three stages. Such a synchronous generator enables an alternating voltage to be delivered that is well regulated and that has a good form factor. It is thus possible to deliver an alternating voltage of substantially constant amplitude, even when the speed of rotation of the engine driving the power supply generator varies. Nevertheless, the complexity of such a multistage synchronous generator generally involves a large amount of bulk, low reliability, and high cost. It is also difficult to introduce redundancy when that is required for reliability reasons.

It is also known, in particular in the technical field of producing electrical energy from wind turbines, that an asynchronous machine may operate as a self-excited asynchronous generator. Such an asynchronous machine typically comprises a rotor having a closed electrical circuit (a squirrel cage or a rotor with windings connected in a closed circuit), and a stator including at least one winding that may be connected to a load. In order to enable operation to take place in self-excited asynchronous generator mode, a bank of capacitors is connected to the asynchronous machine in order to provide reactive power. When the rotor is driven in rotation, and providing the capacitance of the bank of capacitors is selected appropriately as a function of the load and of the speed of rotation, such an asynchronous machine can operate as a generator and deliver electrical energy to the load connected to the stator.

OBJECT AND SUMMARY OF THE INVENTION

The invention seeks to provide a power supply circuit for an aircraft engine that does not present at least some of the above-mentioned drawbacks of the prior art.

To this end, the invention provides a power supply circuit for supplying electrical energy in an aircraft, the circuit comprising a power supply generator for being driven in rotation by the engine of the aircraft in order to power electrical equipment of the aircraft engine, the circuit being characterized in that the power supply generator comprises an asynchronous machine connected to an excitation device;

the asynchronous machine including a rotor suitable for being driven in rotation by the engine and a stator connected to said electrical equipment; and the excitation device being suitable for causing a reactive current of flow in said stator.

The invention thus makes it possible to use an asynchronous machine for powering electrical equipment of an aeroengine, thus presenting several advantages. In particular, an asynchronous machine is a machine that is robust, reliable, and inexpensive. Furthermore, when designing an asynchronous machine, there is a large amount of freedom in selecting its form factor, thereby making it easier to incorporate it in the engine of an aircraft. Furthermore, the excitation device needs to be dimensioned only with respect to the magnetization current of the asynchronous machine, which current is less than the power supply current of the electrical equipment. The excitation device can thus be designed in a manner that is particularly simple and it can be dimensioned in limited manner, thereby enabling the size and the cost of the excitation device to be limited.

The excitation device may comprise one or more capacitors.

Under such circumstances, the excitation device may present a structure that is particularly simple, thereby contributing to limiting its size and its cost.

In an embodiment, the asynchronous machine presents magnetization inductance $L_m$ that may be expressed by the following relationship:

$$L_m = L_0 \frac{I_{\mu 2}^\alpha}{I_{\mu 2}^\alpha + I_m^\alpha}$$

where $L_0$ is the magnetization induction at zero current, $I_{\mu 2}$ is the magnetization current that decreases the magnetization inductance $L_m$ by a factor of 2, $L_m$ is the magnetization current, and $\alpha$ is a coefficient that depends on the characteristics of the asynchronous machine, where $\alpha$ is less than 2.5.

Such a coefficient close to 2 makes it possible to limit the variation in the amplitude of the electric voltage generated by the asynchronous machine, even when the speed of rotation of the engine varies in a ratio of 1 to 2. It is thus possible to power electrical equipment that requires voltage at an amplitude that is substantially constant.

In an embodiment, the power supply circuit includes an electronic control unit suitable for controlling the reactive current delivered by the excitation device.

By means of these characteristics, it is possible to power electrical equipment that requires voltage at an amplitude that is substantially constant.

For example, the excitation device may include a cell of variable capacitance, and the electronic control unit may be suitable for controlling the capacitance of the variable-capacitance cell.

Under such circumstances, the variable-capacitance cell may comprise a module suitable for opening and closing a switch at a duty ratio that is determined as a function of a capacitance setpoint.

In another example, the excitation device comprises an electronic device suitable for delivering a reactive current that is controlled by the electronic control device.

Under such circumstances, the electronic device may be an inverter.

In an embodiment, the power supply circuit includes a second excitation device connected to the asynchronous machine.

Such redundancy makes it possible to improve the reliability of the power supply circuit. In addition, since the excitation device can be designed in a manner that is particularly simple and can be dimensioned in limited manner, this redundancy does not give rise to large size or to large cost.

The invention also provides an aeroengine including a power supply circuit in accordance with the invention.

BRIEF DESCRIPTION OF THE DRAWINGS

The invention can be better understood on reading the following description given by way of non-limiting indication, and with reference to the accompanying drawings, in which.

DETAILED DESCRIPTION OF EMBODIMENTS

Figure 1:
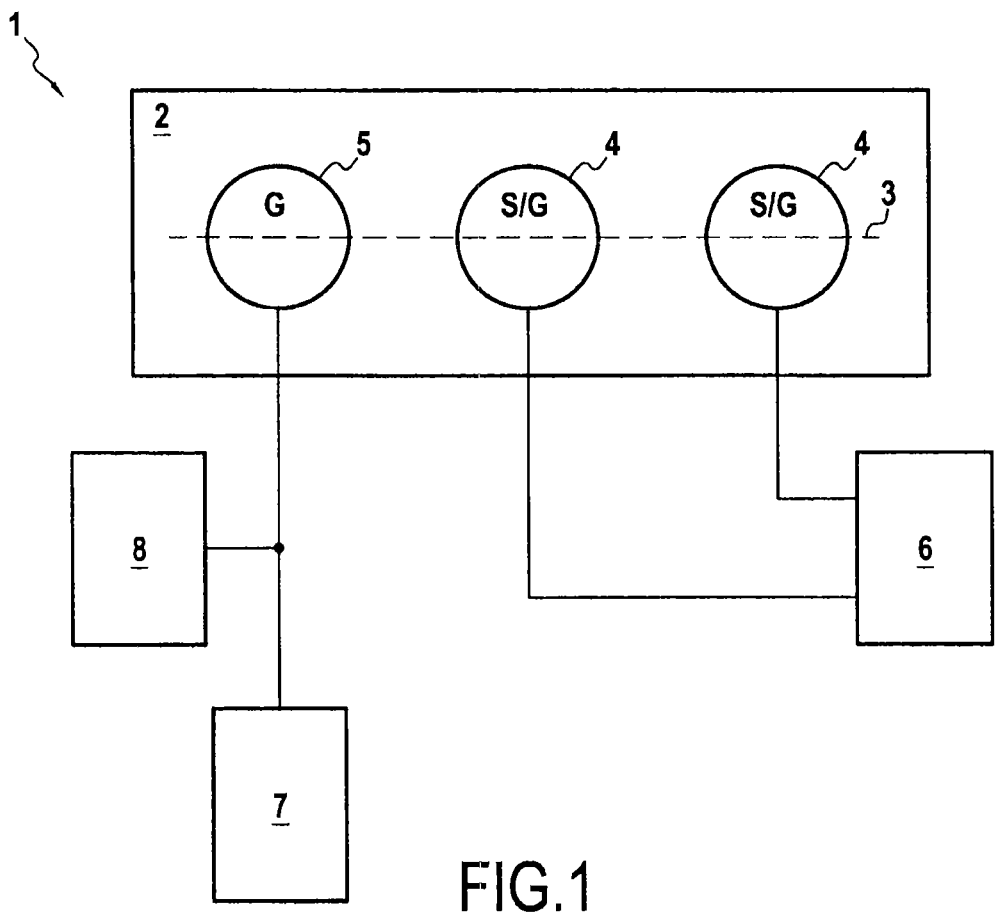
FIG. 1 is a diagram of a power supply circuit in an embodiment of the invention, shown in its environment.

FIG. 1 shows a power supply circuit 1 in an embodiment of the invention, in its environment. The power supply circuit 1 is for powering a piece of electrical equipment 7 of an aircraft engine 2. By way of example, the engine 2 may be a gas turbine. The electrical equipment 7 is of the mainly-resistive type. For example, in the description below, it is considered that the electrical equipment 7 comprises a deicing circuit of the engine 2, made up of deicing resistors incorporated in the inlet edges of the engine 2.

The power supply circuit 1 comprises a power supply generator 5, the electrical equipment 7, and an exciter device 8. The power supply generator 5 may be driven in rotation by a shaft 3 of the engine 2. The shaft 3 is also connected to starter generators (S/G) 4 capable of operating as synchronous electric motors when starting the engine 2 and as synchronous generators when the engine 2 is in operation, e.g. for electrically powering the on-board network 6 of the aircraft.

The power supply generator 5 is an asynchronous machine. Thus, the same reference 5 is also used below to designate the asynchronous machine.

Figure 2:
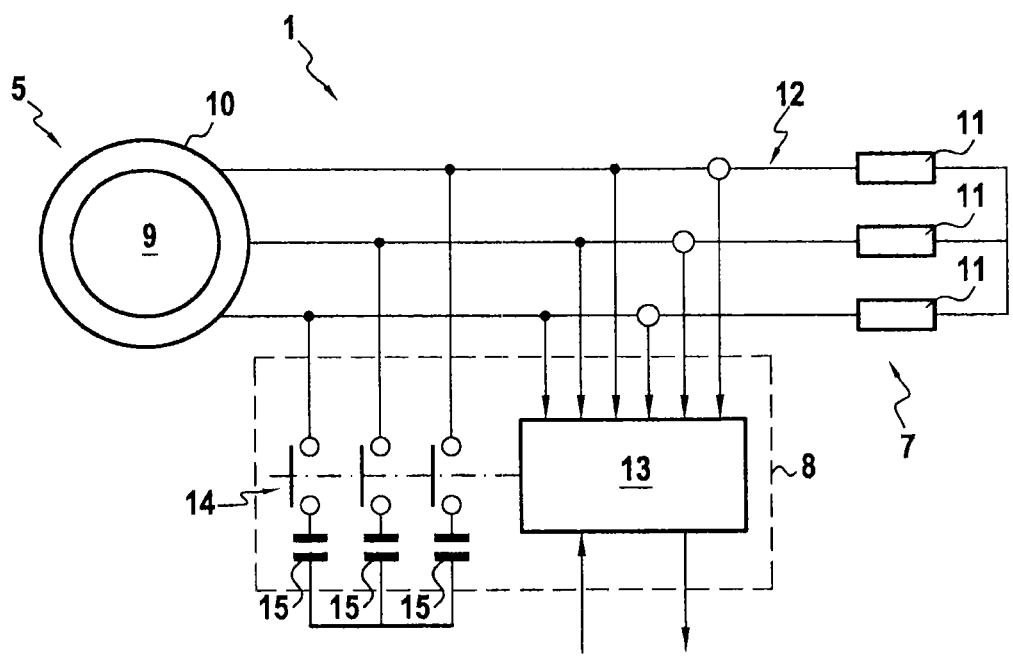
FIG. 2 is a more detailed view of the FIG. 1 power supply circuit.

FIG. 2 shows the power supply circuit 1 in greater detail. The asynchronous machine 5 has a rotor 9 connected to the shaft 3 and a stator 10 connected by an electrical circuit 12 to deicing resistors 11 of the electrical equipment 7. By way of example, the rotor 9 is a squirrel-cage rotor. In the example shown, the stator 10, the electrical circuit 12, and the deicing resistors 11 form a three-phase system. In a variant, they could form a polyphase system.

The exciter device 8 comprises an electronic control unit 13, switches 14, and capacitors 15.

The electronic control unit 13 presents the hardware architecture of a computer. It comprises in particular a processor, a read only memory (ROM), a random access memory (RAM), and an interface. The processor serves to execute computer programs stored in the ROM, while making use of the RAM. The interface makes it possible to receive measurement signals and instruction messages, and also to issue control signals and report messages.

Thus, the electronic control unit 13 receives measurement signals representative of the voltages and the currents in the electrical circuit 12. The electronic control unit 13 may also control the opening or closing of the switches 14. Furthermore, the electronic control unit 13 may receive an instruction message, e.g. from the main computer of the engine 2, said message instructing it to put deicing into operation, and it may send a report message to the main computer about the status and the state of health of the deicing function.

When the switches 14 are in their closed state, the capacitors 15 are connected to the electrical circuit 12, and when the switches 14 are in their open state, the capacitors 15 are not connected to the electrical circuit 12.

The power supply circuit 1 operates as follows.

When the switches 14 are open, no reactive current is delivered to the stator 10. No magnetic field is generated in the asynchronous machine 5. Thus, no electric voltage is generated and the deicing resistors 11 are not powered.

When the switches 14 are closed, they deliver a reactive current to the stator 10. A magnetic field is thus generated in the asynchronous machine 5. If the speed of rotation N of the shaft 3 of the engine 2 is well positioned relative to the capacitances of the capacitors 15 and the resistances of the deicing resistors 11, then the asynchronous machine 5 can operate as a self-excited asynchronous generator, and it can thus generate an electric voltage at the stator 10, thereby enabling the deicing resistors 11 to be powered.

When the switches 14 are closed, a self-triggering phenomenon is initiated by the remanent flux of the asynchronous machine 5. In one embodiment, a triggering-assistance device (not shown) is connected to the electrical circuit 12. When the switches 14 are closed, the triggering-assistance device sends a current pulse into the electrical circuit 12, e.g. via a transformer, in order to create a remanent magnetic field that enables triggering to take place.

In order to enable operation to take place in self-excited asynchronous generator mode, the capacitances of the capacitors 15 must be selected appropriately, in particular as a function of the characteristics of the asynchronous machine 5, of the speed of rotation N of the shaft 3, and of the resistances of the deicing resistors 11. The person skilled in the art knows how to determine the appropriate value for the capacitance, and that does not need to be described in detail.

Figure 3:
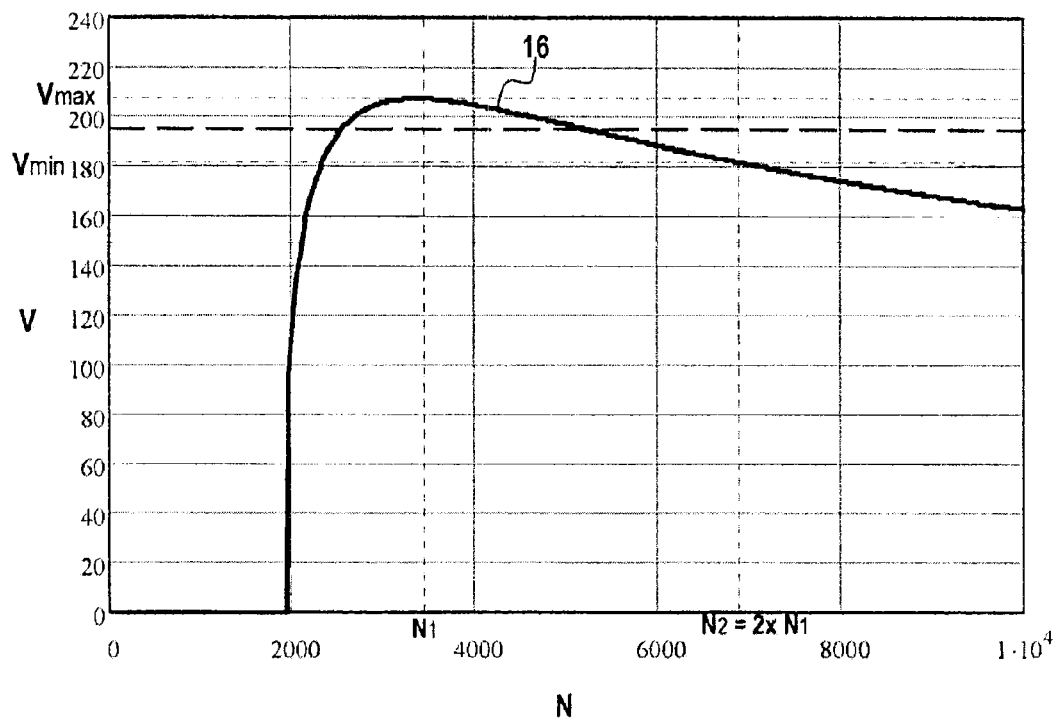
FIGS. 3 and 4 are graphs showing the phase voltage of a FIG. 2 type power supply circuit as a function of speed of rotation.

FIG. 3 is a graph that shows that operation in self-excited asynchronous generator is possible even when the speed of rotation N varies over a range of 1 to 2. Since the electrical equipment 7 is mainly resistive, it can be designed to accept voltage variations of several percent without any great penalty.

In particular, the asynchronous machine 5 may be characterized by its magnetization inductance $L_m$ which may be expressed by a saturation relationship using the following equation:

$$L_m = L_0 \frac{I_{\mu 2}^\alpha}{I_{\mu 2}^\alpha + I_m^\alpha}$$

In the equation:

$L_m$ is the magnetization induction (in henries);

$L_0$ is the magnetization induction at zero current (in henries);

$I_{\mu 2}$ is the magnetization current that causes the magnetization inductance $L_m$ to decrease by a factor of 2;

$I_m$ is the magnetization current; and $\alpha$ is a coefficient that depends on the characteristics of the asynchronous machine 5, mainly on the magnetic material used and on the airgap.

For a typical asynchronous machine, the coefficient $\alpha$ is about 3. Curve 16 in FIG. 3 shows how the voltage V generated by the asynchronous machine 5 varies for a coefficient $\alpha=3$.

It can be seen that for a speed of rotation N varying over a range of 1 to 2, in a typical operating range of an aircraft engine extending from $N_1=3500$ revolutions per minute (rpm) to $N_2=7000$ rpm, the voltage V varies over a range $[V_{min}-V_{max}]$ corresponding to a voltage variation of about +6.2% to −6.2%, which corresponds to a power variation of about 25%, between the minimum speed $N_1$ and the maximum speed $N_2$. Since the electrical equipment 7 is mainly resistive, such variation can be acceptable, in an embodiment.

Figure 4:
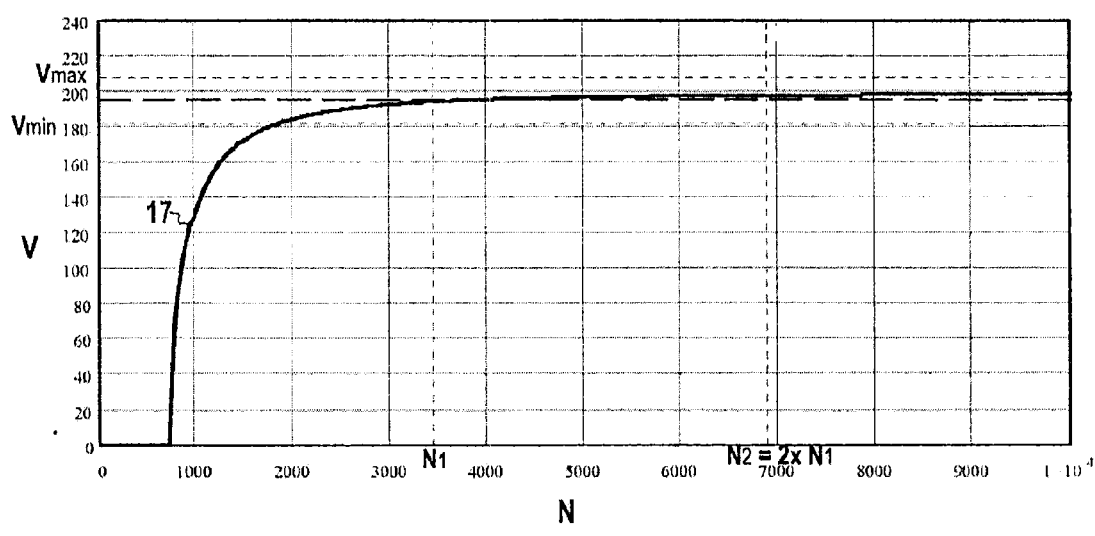

FIG. 4 is a graph similar to that of FIG. 3, in which the curve 17 corresponds to a coefficient α=2. It can be seen that the variation in the voltage V is much smaller than it is in FIG. 3. Thus, if the electrical equipment 7 can accommodate only a limited amount of variation in voltage, an embodiment of the invention proposes designing the asynchronous machine 5 in such a manner as to obtain a coefficient α that is close or equal to 2, e.g. by appropriately selecting the magnetic material used or by appropriately dimensioning the airgap. An example of a suitable magnetic material is laminations made of FeCo.

In the context of the present description, it is considered that a coefficient α is close to 2 if it is less than 2.5, and preferably less than 2.25.

In the embodiment of FIG. 2, regardless of whether the asynchronous machine 5 presents a coefficient α close to 2 (as shown in FIG. 4) or greater (as shown in FIG. 3), the excitation device 8 may comprise simple capacitors 15 of constant capacitance that are connected to the electrical circuit 12 by switches 14. Furthermore, the capacitors 15 and the switches 14 may be dimensioned solely with respect to the magnetization current needed by the asynchronous machine 5, which is less than the power supply current delivered to the deicing resistors 11. The excitation device 8 can thus be designed in particularly simple manner and can be dimensioned to particularly limited quantities, thereby making it possible to limit the size and the cost of the excitation device 8.

Figure 5:
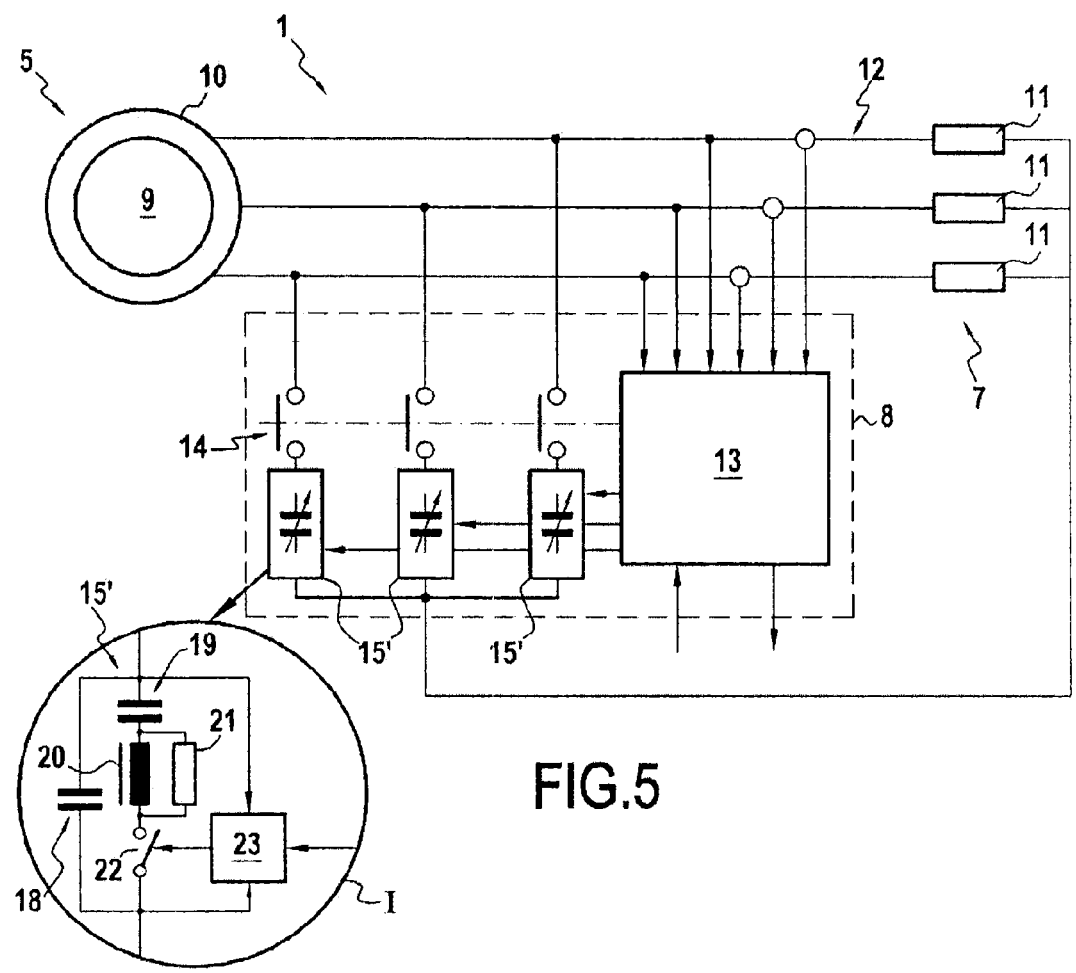
FIGS. 5, 7, and 8 are figures similar to FIG. 2 showing other embodiments of the invention.
Figure 6:
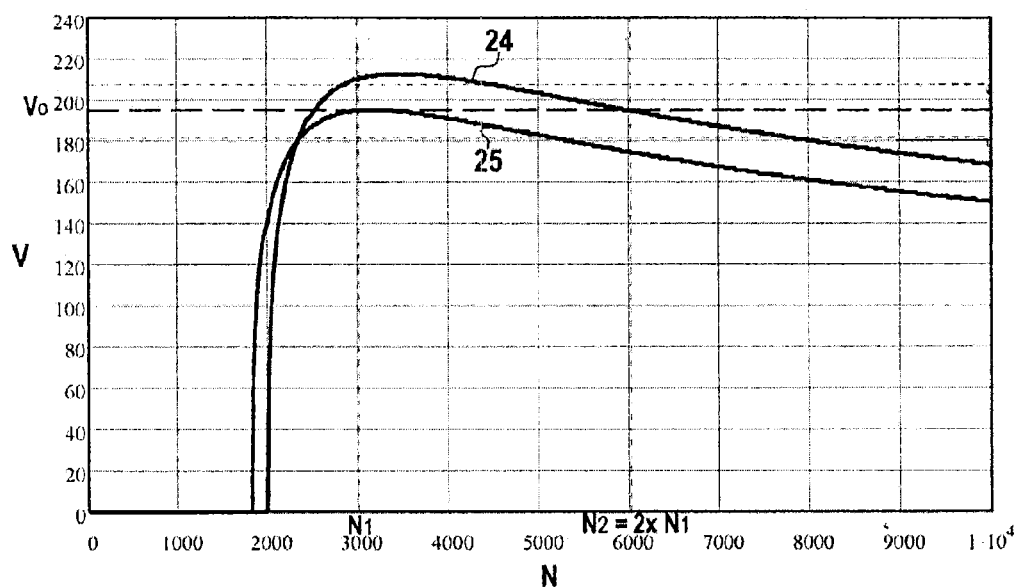
FIG. 6 is a graph showing the phase voltage of a FIG. 5 power supply circuit as a function of speed of rotation.

With reference to FIGS. 5 and 6, there follows a description of an embodiment in which the capacitors 15 are replaced by cells 15' that are of variable capacitance. The other elements of the power supply circuit 1 of FIG. 5 are identical or similar to those of FIG. 2. They are thus given the same references and they are not described again in detail.

In FIG. 5, detail I shows an embodiment of a variable-capacitance cell 15'.

In this example, the cell 15' is a switched-capacitance cell comprising a capacitor 18 of capacitance Ca connected in parallel with a branch that includes, in series: a capacitor 19 of capacitance Cb; an LR circuit comprising a parallel connection of an inductor 20 and a resistor 21; and a switch 22. The cell 15' also has a module 23 suitable for controlling the switch 22. The module 23 and the switch 22 may be made in the form of electronic circuits.

When the switch 22 is open in permanent manner, the cell 15' presents capacitance C that is equal to Ca. When the switch 22 is closed in permanent manner, the cell 15' presents capacitance C equal to Ca+Cb. Furthermore, when the unit 23 causes the switch 22 to open and close with a duty ratio D, the cell 15' behaves like a capacitance C equal to Ca+Cb*D.

As a function of a capacitance setpoint received from the electronic control unit 13 and as a function of a measurement of the capacitance C, the module 23 causes the switch 22 to be opened, to be closed, or to be switched between being opened and closed at a duty ratio D. The frequency of the pulse-width modulation used for obtaining a determined duty ratio D is selected to be much higher than the electrical frequency of the asynchronous machine 5.

The inductor 20 serves to limit the amplitude of the transient current on closing the switch 22, and the resistance 21 on opening the switch 22. The resonant frequency of the LC circuit constituted by the capacitor 19 and the inductor 20 is selected to be much higher than the pulse-width modulation frequency.

FIG. 6 is a graph similar to the graphs of FIGS. 3 and 4, for an asynchronous machine 5 having a coefficient α=3. The curves 24 and 25 show how the voltage V varies as a function of the speed of rotation N, for two different values of the capacitance C of the cells 15'. More precisely, the curve 24 corresponds to a capacitance $C_1$ smaller than the capacitance $C_2$, which corresponds to the curve 25. The curve 25 passes via the point $(N_1, V_0)$ and the curve 24 passes via the point $(N_2, V_0)$. The curves in FIG. 6 correspond to an example in which the capacitance $C_1$ is 18% less than the capacitance $C_2$.

For any capacitance C lying in the range $C_1$ to $C_2$, it is possible to trace a curve that is situated between the curves 24 and 25. This curve passes via a point $(N, V_0)$ where N lies in the range $N_1$ to $N_2$.

It can thus be seen that for any speed of rotation N lying in the range $N_1$ to $N_2$, it is possible to produce a voltage of amplitude $V_0$ by controlling the cells 15' so as to obtain a corresponding capacitance C.

Thus, in the power supply circuit 1 of FIG. 1, the electronic control unit 13 determines a capacitance setpoint for the cells 15', in particular as a function of the speed of rotation N, so as to deliver an alternating voltage to the deicing resistors 11 at an amplitude $V_0$ that is substantially constant. The setpoint as determined is transmitted to the modules 23 of the cells 15'.

Compared with the embodiment of FIG. 2, the embodiment of FIG. 5 makes it possible to power electrical equipment 7 that requires a power supply voltage of amplitude that is substantially constant. In addition, the switch 22 may be dimensioned to correspond to a fraction only of the magnetization current, thereby contributing to limiting the size and the cost of the excitation device 8.

Figure 7:
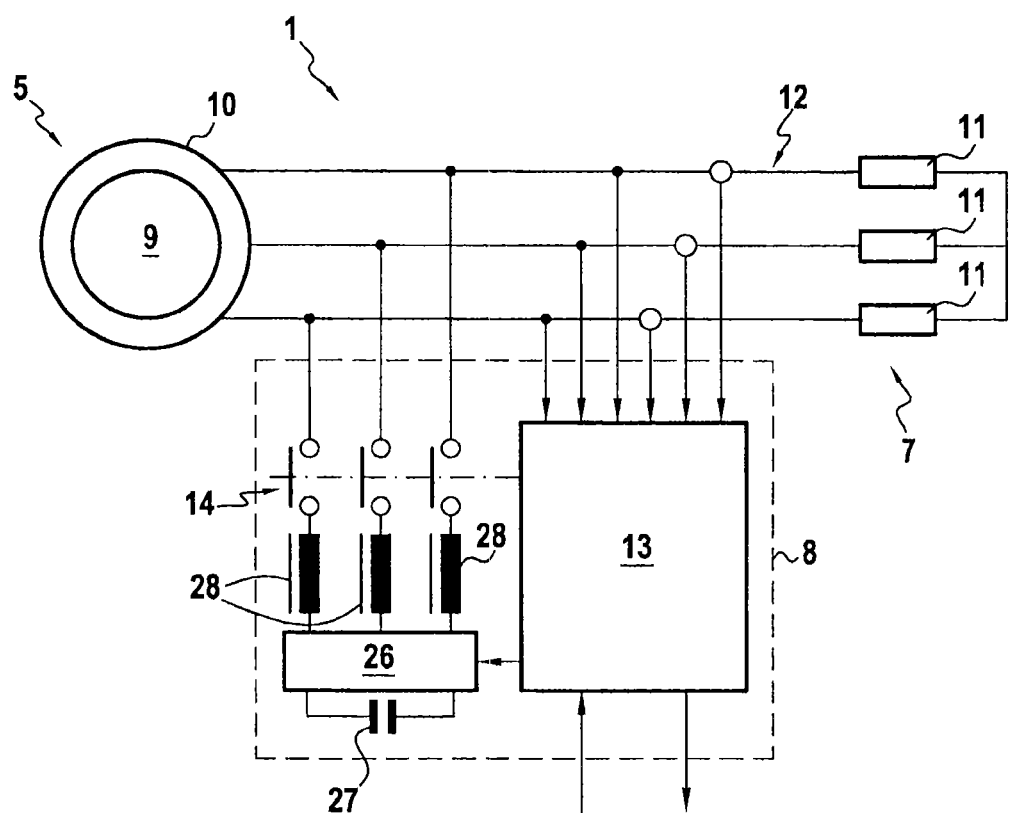

With reference to FIG. 7, there follows a description of an embodiment in which the capacitors 15 are replaced by an inverter 26 and a capacitor 27. The other elements of the power supply circuit 1 of FIG. 7 are identical or similar to those of FIG. 2. They are thus given the same references and are not described again in detail.

The inverter 26 is a three-phase inverter in which the bridge arms are connected to the electrical circuit 12 via switches 14 and smoothing inductors 28. The capacitor 27 is connected to the power supply rails of the inverter 26 in order to store energy as is required for exchanging reactive power.

The inverter 26 is controlled by the electronic control unit 13, in particular as a function of the speed of rotation N, so as to deliver a magnetization current corresponding to generating an alternating voltage of substantially constant amplitude $V_0$, for a speed of rotation N varying over a determined range.

Compared with the embodiment of FIG. 2, the embodiment of FIG. 7 serves to power electrical equipment 7 that requires a power supply voltage of amplitude that is substantially constant. In addition, the inverter 26 may be dimensioned merely for the magnetization current needed by the asynchronous machine 5, which is less than the power supply current delivered to the deicing resistors 11, thereby contributing to limiting the size and the cost of the excitation device 8.

Figure 8:
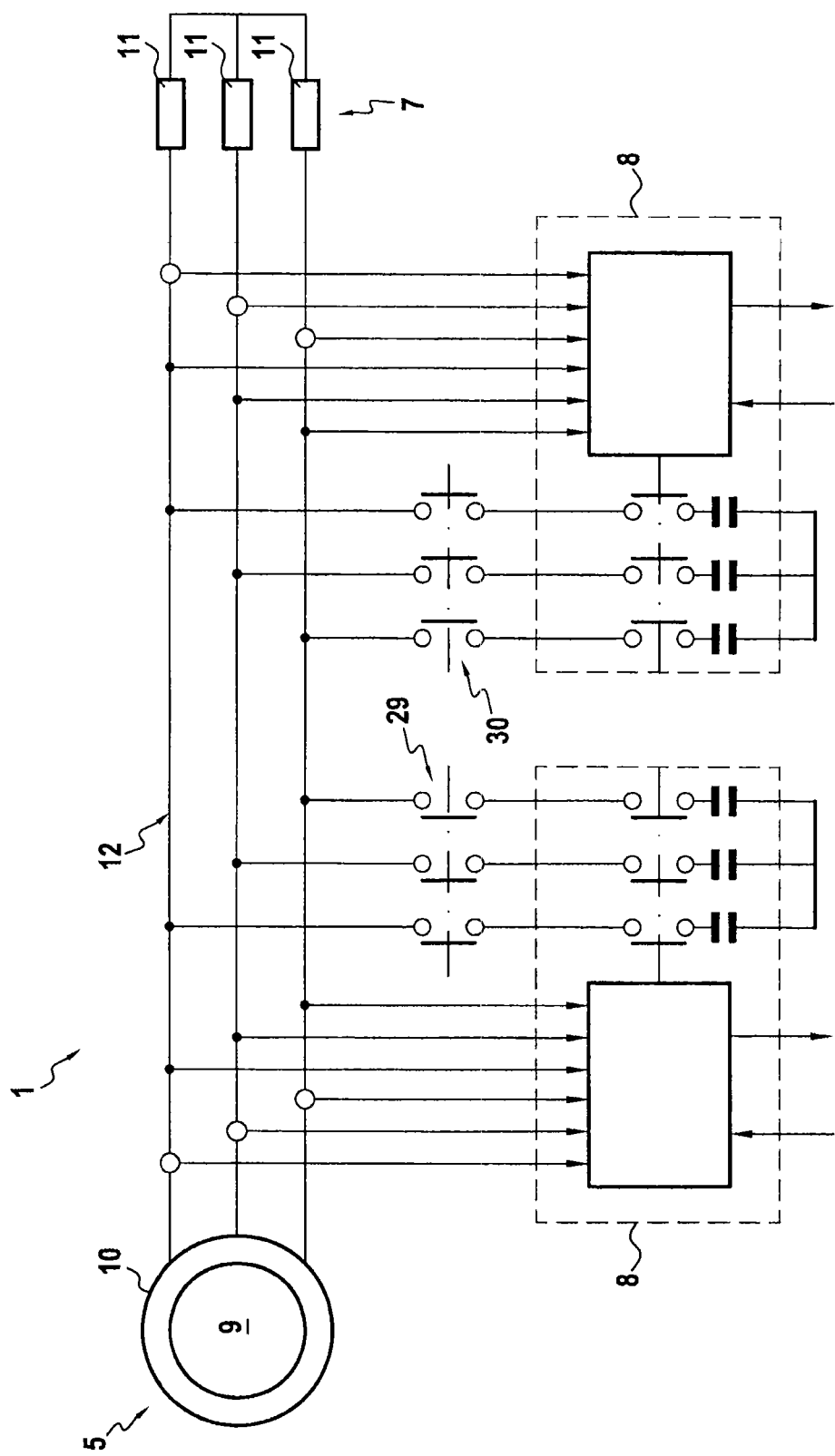

FIG. 8 shows an embodiment in which the excitation device 8 is made redundant. In FIG. 8, the excitation devices 8 that are shown are constant-capacitance devices, as in the embodiment of FIG. 2. In a variant, they could be variable-capacitance devices as shown in the embodiment of FIG. 5, or inverter devices as shown in the embodiment of FIG. 7.

In the embodiment shown, switches 29 and 30 serve to connect one or the other of the excitation devices 8 as a function of an active channel signal generated by a protection device (not shown), which may for example be the main computer of the engine 2. When a failure is detected on the active excitation device 8, it is then possible to switch over to the other excitation device 8, thereby providing the power supply circuit 1 with greater reliability.

In a variant that is not shown, the excitation devices 8 are connected directly to the electric circuit 12, i.e. without the switches 29 and 30. Under such circumstances, the internal switches 14 of the non-active excitation device 8 are kept open.

As explained above, the excitation devices 8 of FIGS. 2, 5, and 7 may be dimensioned in terms of the magnetization current (excitation current) needed by the asynchronous machine 5, which current is less than the power supply current required by the electrical equipment 7. Thus, the redundancy proposed in FIG. 8 does not involve large bulk or high cost.

The invention thus makes it possible to use an asynchronous machine, e.g. for powering the deicing resistors of an aircraft engine, and this presents several advantages. In particular, an asynchronous machine is a machine that is robust, reliable, and inexpensive. In addition, when designing an asynchronous machine, there is a large amount of freedom in terms of form factor, thus making it easier to integrate in an aircraft engine.

In addition, the power supply circuit 1 may easily be monitored by the electronic control unit 13. If the electronic control unit 13 acting as a function of current measured in the electrical circuit 12, determines that the currents flowing through the deicing resistors 11 are too high, e.g. because of a short-circuit type fault, then it can cause the switches 14 to be opened, thereby de-exciting the asynchronous machine 5.

In addition, even if the electronic control unit 13 does not detect a fault or does not cause the switches 14 to be opened, the deicing resistors 11 can be protected against excess current if, by design, the maximum level of power that can be delivered by the power supply 1, coincides with (or is no greater than) the maximum level of power that can be accommodated by the deicing resistors 11. A short-circuit type fault, even if only partial, can cause the resistances of the deicing resistors 11 to vary. Under such circumstances, the magnetizing current delivered by the excitation device 8 is no longer suitable for operation in self-excited asynchronous generator mode, and a de-triggering phenomenon occurs, thereby causing the generation of electrical power to come to an end.

The invention claimed is:

1. A power supply circuit for supplying electrical energy in an aircraft, the circuit comprising:
    a power supply generator configured to be driven in rotation by an engine of the aircraft to power electrical equipment of the aircraft engine, the power supply generator comprising an asynchronous machine connected to an excitation device;
    the asynchronous machine including a rotor configured to be driven in rotation by the engine and a stator connected to the electrical equipment; and
    the excitation device is configured to cause a reactive current of flow in the stator;
    wherein the excitation device includes one or more capacitors; and
    the asynchronous machine presents magnetization inductance Lm expressed by relationship:

$$L_m = L_0 \frac{I_{\mu 2}^\alpha}{I_{\mu 2}^\alpha + I_m^\alpha}$$

in which $L_0$ is magnetization induction at zero current, $I_{\mu 2}$ is magnetization current that decreases the magnetization inductance $L_m$ by a factor of 2, $I_m$ is magnetization current, and $\alpha$ is a coefficient that depends on characteristics of the asynchronous machine, wherein $\alpha$ is less than 2.5.

2. A power supply circuit according to claim 1, further comprising a second excitation device connected to the asynchronous machine.

3. An aeroengine comprising a power supply circuit according to claim 1.

4. An aeroengine comprising a power supply circuit according to claim 2.

* * * * *